(12) United States Patent
Yamasaki et al.

(10) Patent No.: US 11,574,582 B2
(45) Date of Patent: Feb. 7, 2023

(54) DISPLAY SYSTEM AND DISPLAY DEVICE

(71) Applicant: HITACHI, LTD., Tokyo (JP)

(72) Inventors: Koji Yamasaki, Tokyo (JP); Chiyo Ohno, Tokyo (JP); Shoji Yamamoto, Tokyo (JP); Takuya Nakamichi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/536,148

(22) Filed: Nov. 29, 2021

(65) Prior Publication Data

US 2022/0293036 A1 Sep. 15, 2022

(30) Foreign Application Priority Data

Mar. 11, 2021 (JP) .............................. JP2021-039144

(51) Int. Cl.
*G06F 3/01* (2006.01)
*G09G 3/20* (2006.01)
*G06F 3/16* (2006.01)

(52) U.S. Cl.
CPC ........... *G09G 3/2096* (2013.01); *G06F 3/011* (2013.01); *G06F 3/012* (2013.01); *G06F 3/013* (2013.01); *G06F 3/167* (2013.01); *G09G 2340/0464* (2013.01); *G09G 2354/00* (2013.01)

(58) Field of Classification Search
CPC ......... G09G 3/2096; G09G 2340/0464; G09G 2354/00; G06F 3/011; G06F 3/012; G06F 3/013; G06F 3/0346; G06F 3/167
See application file for complete search history.

(56) References Cited

U.S. PATENT DOCUMENTS

| | | | | |
|---|---|---|---|---|
| 9,563,057 B2* | 2/2017 | Lim | ....................... | G06F 3/0304 |
| 9,740,935 B2* | 8/2017 | Dusik | .................... | G06V 20/20 |
| 10,503,391 B2* | 12/2019 | Lim | ....................... | G06F 3/0488 |
| 10,645,374 B2* | 5/2020 | Takeda | ................. | G02B 27/017 |
| 10,872,460 B1* | 12/2020 | Luo | ......................... | G06T 15/08 |
| 11,321,042 B2* | 5/2022 | Sugumi | ................. | G06F 3/1446 |
| 11,333,892 B2* | 5/2022 | Ohno | ................. | G02B 27/0172 |
| 2015/0146007 A1* | 5/2015 | Dusik | .................... | G06V 20/20 348/161 |
| 2017/0257620 A1* | 9/2017 | Takeda | ................. | H04N 13/344 |

FOREIGN PATENT DOCUMENTS

JP 2019-101330 A 6/2019

* cited by examiner

*Primary Examiner* — Vijay Shankar
(74) *Attorney, Agent, or Firm* — Mattingly & Malur, PC

(57) ABSTRACT

A display system includes a display and a detector configured to detect an orientation of the display. The display system includes a display source image generation unit configured to generate a display source image including a first image and a second image related to this first image; and a visual field image display unit configured to display the first image in a first display region of the display and display the second image in a second display region of the display. The visual field image display unit is configured to set a predetermined fixed region of the display as the first display region when a display mode associated with the first image is a first display mode, and determine the first display region according to the orientation of the display when the display mode is a second display mode.

14 Claims, 9 Drawing Sheets

FIG. 4
| # | WORK TARGET PORTION | WORK CONTENT | RELATED DRAWING | COMPLETION F | COMPLETION DATE AND TIME | DISPLAY M |
|---|---|---|---|---|---|---|
| 1 | XXX | ###### | DRAWING 1 | YES | 20210209-134534 | 1 |
| 2 | YYY | ###### | DRAWING 2 | NO | N/A | 2 |
| ... | ... | ... | ... | ... | ... | ... |
FIG. 5
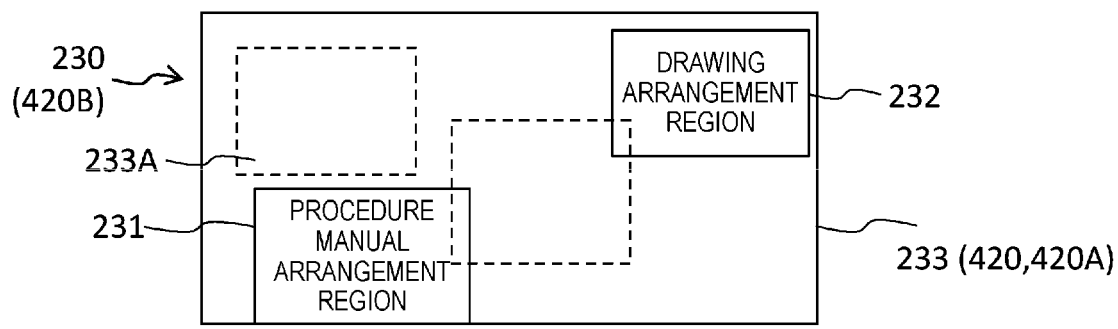
FIG. 6
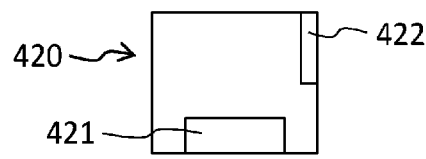
FIG. 7
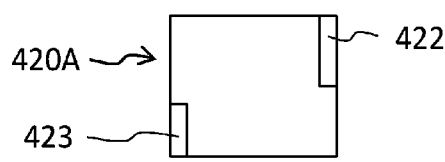

DISPLAY SYSTEM AND DISPLAY DEVICE

CROSS-REFERENCE TO RELATED APPLICATION

The present application claims priority from Japanese application JP2021-039144, filed on Mar. 11, 2021, the contents of which is hereby incorporated by reference into this application.

BACKGROUND OF THE INVENTION

1. Field of the Invention

The present invention relates to a display system and a display device that displays information for supporting a work.

2. Description of the Related Art

In a work in a factory (plant) such as manufacturing of a product and inspection and repair of factory equipment, the work may be performed while referring to a work manual such as a procedure manual and a drawing. However, depending on a work environment, it may be difficult to arrange a device such as a display that displays the work manual near a work target. As a display device that can be used in such a case, a see-through type head-mounted display device (head-mounted display, hereinafter, also referred to as HMD) and smart glasses, which are to be worn on the head of a worker and superimpose an image of a virtual space on a real space to display the image, are attracting attention. When the see-through type HMD or the like is used, the worker does not have to hold the display device in the hand or go to see the display device in a distance, and work efficiency can be improved.

A display control in the HMD is easy to use by changing and forming a display screen in accordance with a state of the HMD or the worker, or a display content. For example, in a HMD described in JP-A-2019-101330, an image of a virtual camera in which an image of a virtual space is captured is generated in accordance with a visual line angle measured by the HMD, and is displayed together with an image that does not change according to the angle.

The invention described in JP-A-2019-101330 displays, for example, a first image indicating a state of the virtual space according to an orientation of a non-transmission HMD and a second image that does not change in a predetermined region of the display screen according to the orientation of the HMD. On the other hand, in a HMD that supports a work at a site such as a factory, an appropriate display method for a first image and a second image differs depending on a device to be used, a scene to be used, and a display content. Therefore, the technique described in JP-A-2019-101330 cannot be said suitable as a display device for a work at a site.

SUMMARY OF THE INVENTION

The invention is made in view of such a background, and an object of the invention is to provide a display system and a display device suitable for a worker who works in a real space and capable of displaying information related to a work.

In order to solve the above-mentioned problem, the display system according to the invention includes a display; a detector configured to detect an orientation of the display; a display source image generation unit configured to generate a display source image including a first image and a second image related to the first image; and a visual field image display unit configured to display the first image in a first display region of the display and display the second image in a second display region of the display. In the display system, the visual field image display unit is configured to set a predetermined fixed region of the display as the first display region when a display mode associated with the first image is a first display mode, and determine the first display region according to the orientation of the display when the display mode is a second display mode.

According to the invention, it is possible to provide a display system and a display device suitable for a worker who works in a real space and capable of displaying information related to a work. Problems, configurations, and effects other than those described above will be further clarified with the following description of embodiments.

BRIEF DESCRIPTION OF THE DRAWINGS

FIG. 4 is a data configuration diagram of a work manual database according to the first embodiment;

FIG. 5 is a diagram showing a configuration of a display source image according to a first embodiment;

FIG. 6 is a diagram showing a configuration of a visual field image displayed on a display in a first display mode according to the first embodiment;

FIG. 7 is a diagram showing a configuration of a visual field image displayed on the display in a second display mode according to the first embodiment;

DESCRIPTION OF THE PREFERRED EMBODIMENTS

Figure 1:
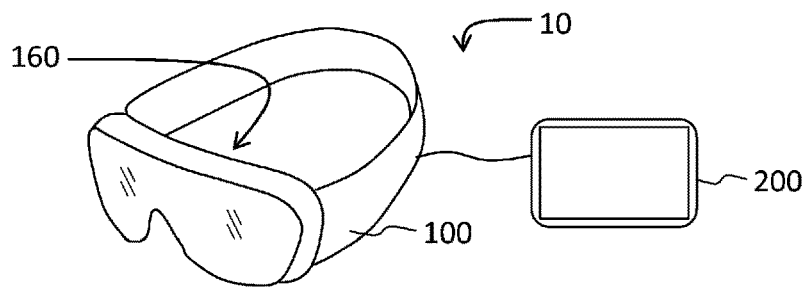
FIG. 1 is a diagram showing a configuration of a display system according to a first embodiment.

Hereinafter, a display system according to modes (embodiments) for carrying out the invention will be described. The display system includes a smartphone and a transmission type HMD (head-mounted display). The smartphone stores a procedure manual and a drawing of a work, generates an image (also referred to as a display source image) including the procedure manual of work steps performed by a worker and the drawing in respective predetermined regions, and transmits the image to the HMD.

The HMD displays the procedure manual and the drawing included in the display source image at predetermined positions according to display modes. For example, in a first display mode, the HMD cuts out an image from the region of the procedure manual included in the display source image, and displays the cut-out image at a predetermined position (for example, lower center) on a screen of the HMD. The HMD displays the drawing according to an orientation of a main body of the HMD. For example, it is assumed that the region of the drawing is on a right side of the source image (see a drawing arrangement region 232 in a display source image 230 of FIG. 5 to be described later). In this case, the HMD does not display the drawing when the worker is facing front. The HMD displays a left side of the drawing on a right side of the screen when detecting the worker faces right slightly, and displays the entire drawing on the right side of the screen when detecting that the worker faces right significantly.

In this way, by displaying the procedure manual and the drawing by the HMD, the worker can perform the work while constantly referring to the procedure manual. Further, the worker can refer to the drawing by facing right. When the worker is facing front, no drawing is displayed, and a visual field for the worker to see a work target and a work site (real space) is not obstructed. As a result, the worker can work with both hands without operating the smartphone or the HMD with the hands, and can work while referring to the procedure manual and drawing.

In a second display mode, the HMD displays the image cut out from the display source image as it is on the screen of the HMD. Since the procedure manual is not fixedly displayed compared to the first display mode, visibility of the real space (work place and work space) is improved.

The display system switches between the first display mode and the second display mode in accordance with the work. By appropriately setting the display modes in accordance with a work content (procedure manual), the worker can perform the work without switching the display modes.

First Embodiment: Overall Configuration of Display System

FIG. 1 is a diagram showing a configuration of a display system 10 according to a first embodiment. The display system 10 includes a HMD 100 (display device) and a smartphone 200 (portable device). The HMD 100 is, for example, a goggle type display device to be worn on a head to cover a visual field. The HMD 100 and the smartphone 200 are connected by, for example, a universal serial bus (USB) cable, and may be connected by a cable of another standard or be connected wirelessly. A USB may be connected to the smartphone 200, converted to an image output connector such as a high-definition multimedia interface (HDMI) or a display port via a conversion adapter, and connected to the HMD 100. It should be noted that the HMD 100 also includes smart glasses to be worn and used as glasses. Similarly, the smartphone 200 (portable device) includes a portable terminal such as a tablet or a notebook PC.

First Embodiment: Configuration of HMD

Figure 2:
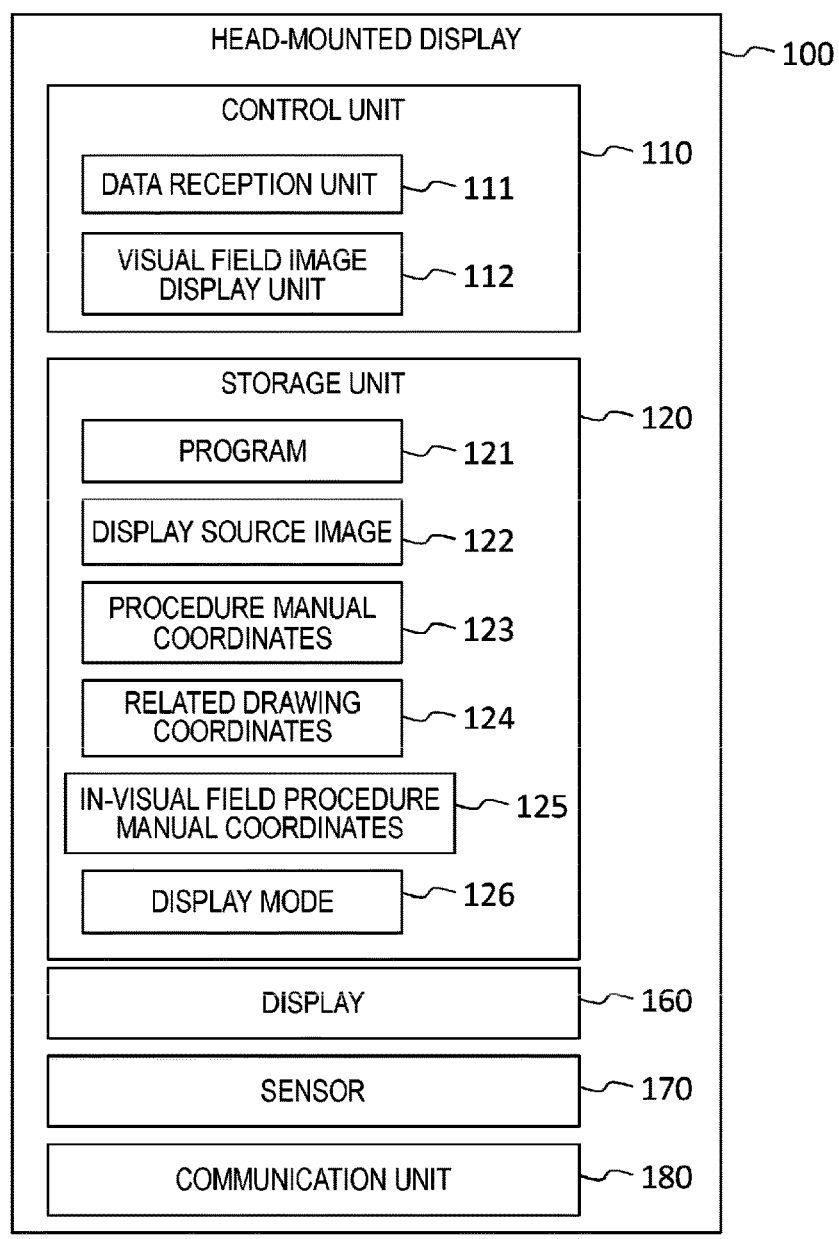
FIG. 2 is a functional block diagram of a HMD according to the first embodiment.

FIG. 2 is a functional block diagram of the HMD 100 according to the first embodiment. The HMD 100 includes a control unit 110, a storage unit 120, a display 160, a sensor 170, and a communication unit 180. The communication unit 180 includes one or more communication interfaces such as USB and Wi-Fi (Registered Trademark), and transmits and receives data to and from the smartphone 200.

The display 160 is a transmission display device having a high transmittance provided at a front portion of the HMD 100 (see FIG. 1). The HMD 100 may be a binocular type HMD as shown in FIG. 1 or a monocular type HMD to be used by either left or right eye. The worker can work while referring to information displayed on the display 160 by wearing the HMD 100.

The sensor 170 is a sensor including, for example, a micro electro mechanical system (MEMS) type gyroscope, and detects an angle or an angular velocity of the HMD 100 and outputs the detected angle or angular velocity to the control unit 110. An illuminance sensor that measures illuminance of surroundings and a camera that captures an image of the surroundings or the worker may be provided.

The storage unit 120 includes a read only memory (ROM), a random access memory (RAM), a flash memory, and the like. The storage unit 120 stores a program 121, a display source image 122, procedure manual coordinates 123, related drawing coordinates 124, in-visual field procedure manual coordinates 125, and a display mode 126. The program 121 is a program to be executed by a central processing unit (CPU) constituting the control unit 110, and controls the HMD 100. The program 121 includes descriptions on process procedures other than a visual field image display process (see FIG. 11 to be described later).

The display source image 122 is a display source image 230 (see FIGS. 3 and 5 to be described later) received from the smartphone 200, and is an image that is a basis of a visual field image displayed on the display 160. The procedure manual coordinates 123, the related drawing coordinates 124, and the in-visual field procedure manual coordinates 125 are coordinate data indicating regions in the display source image 122 received from the smartphone 200, and are equivalent to procedure manual coordinates 221, related drawing coordinates 222, and in-visual field procedure manual coordinates 223 stored by the smartphone 200 (see FIG. 3), which will be described later. In addition, the display mode 126 indicates a display method for the visual field image, and is equivalent to a display mode 224 stored by the smartphone 200, which will be described later.

The control unit 110 includes a CPU, a data reception unit 111, and a visual field image display unit 112. The data reception unit 111 stores data received from the smartphone 200 in the display source image 122, the procedure manual coordinates 123, the related drawing coordinates 124, the in-visual field procedure manual coordinates 125, and the display mode 126.

The visual field image display unit 112 cuts out an image from the display source image 122 (see the display source image 230 described in FIG. 5 to be described later) and displays the cut-out image on the display 160 in accordance with the display mode 126. When cutting out an image, the visual field image display unit 112 refers to the procedure manual coordinates 123, the related drawing coordinates 124, the in-visual field procedure manual coordinates 125, and the display mode 126.

First Embodiment: Configuration of Smartphone

Figure 3:
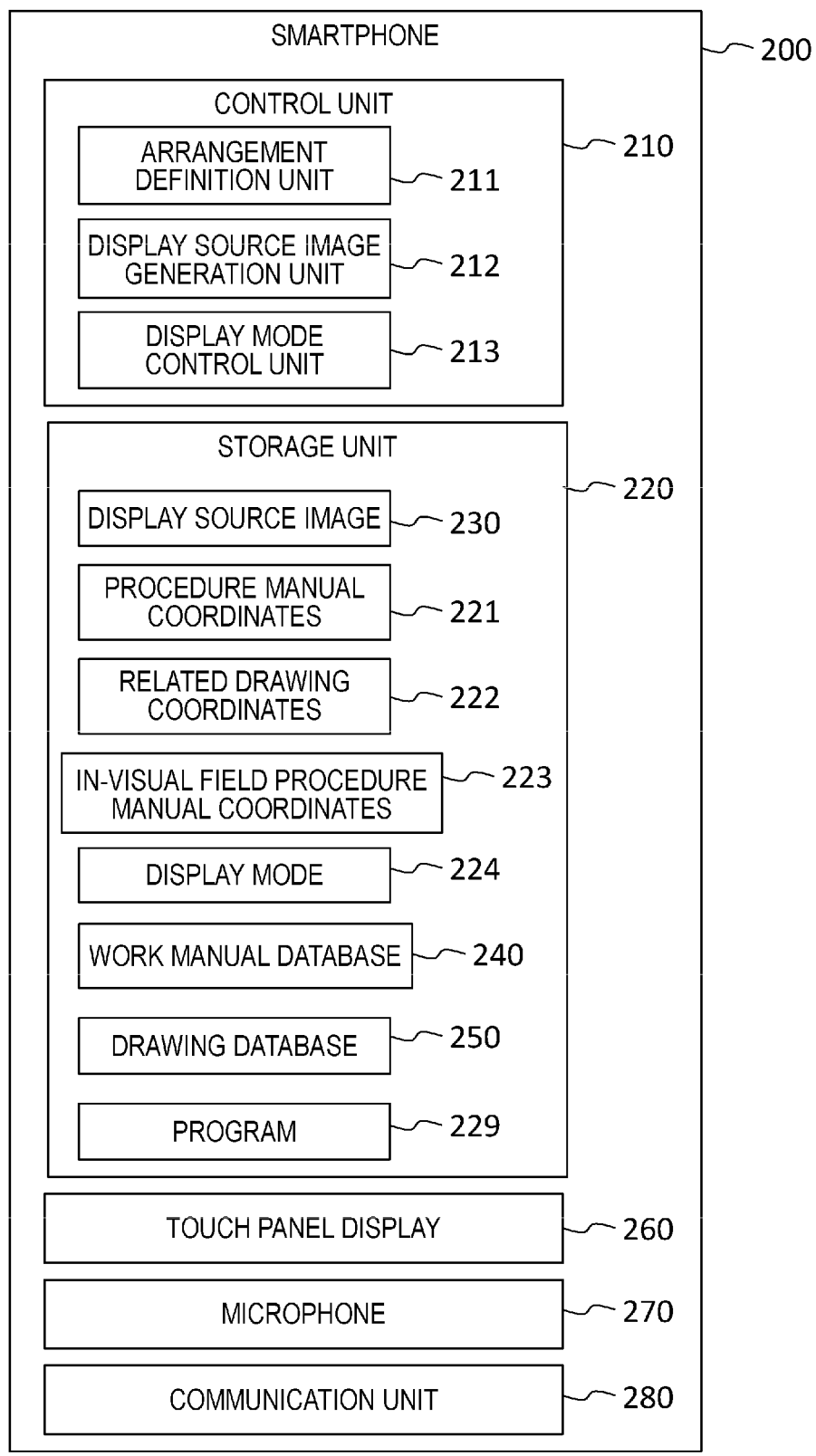
FIG. 3 is a functional block diagram of a smartphone according to the first embodiment.

FIG. 3 is a functional block diagram of the smartphone 200 according to the first embodiment. The smartphone 200 includes a control unit 210, a storage unit 220, a touch panel display 260, a microphone 270, and a communication unit 280. The communication unit 280 includes one or more communication interfaces such as USB and Wi-Fi, and transmits and receives data to and from the HMD 100.

The storage unit 220 includes a ROM, a RAM, a flash memory, and the like. The storage unit 220 stores the display source image 230, the procedure manual coordinates 221, the related drawing coordinates 222, the in-visual field procedure manual coordinates 223, the display mode 224, a work manual database 240 (see FIG. 4 to be described later), a drawing database 250, and a program 229.

The program 229 is a program to be executed by the CPU constituting the control unit 210, and controls the smartphone 200. The program 229 includes descriptions on process procedures other than a display source image generation process (see FIG. 10 to be described later).

FIG. 4 is a data configuration diagram of the work manual database 240 according to the first embodiment. The work manual database 240 is, for example, data in a tabular form. One row (record) of the work manual database 240 indicates one work step to be executed by a worker who is a user of the display system 10. Each record includes a step number 241 (described as # in FIG. 4), a work target portion 242, a work content 243, a related drawing 244, a completion flag 245 (described as completion F in FIG. 4), a completion date and time 246, and a display mode 247 (described as display M in FIG. 4).

The step number 241 is a number given to a work step and indicates an order of the work step. The work target portion 242 indicates a portion to be subjected to a work such as repair or inspection, and is, for example, a name of a work target of "machine 1 of model A". The work content 243 is an explanatory text of a work step displayed on the display 160 (see FIGS. 1 and 2), and is, for example, an explanatory text of a work content of "turning off switch B". The related drawing 244 is a drawing related to a work step and is identification information on a drawing displayed on the display 160. The completion flag 245 indicates whether a work step is completed ("YES") or uncompleted ("NO"). The completion date and time 246 is a date and time when a work step is completed. The display mode 247 indicates how to display a procedure manual and a related drawing, and specifies first to third display modes in the first embodiment. Details of the display modes will be described later.

Returning to FIG. 3, the drawing database 250 stores a drawing related to a work step. The identification information corresponding to the related drawing 244 (see FIG. 4) is given to the drawing. The control unit 210 can access the drawing by specifying the identification information. The display source image 230, the procedure manual coordinates 221, the related drawing coordinates 222, and the in-visual field procedure manual coordinates 223 will be described with reference to FIGS. 5 to 8 to be described later.

The display mode 224 is a mode according to a configuration of a visual field image including a procedure manual or a drawing, and in the first embodiment, three modes including the first to third display modes are set. Details of the display modes will also be described with reference to FIGS. 5 to 8.

First Embodiment: Display Source Image and Visual Field Image

FIG. 5 is a diagram showing a configuration of the display source image 230 according to the first embodiment. The display source image 230 is an image that is a basis of an image displayed on the display 160 (see FIGS. 1 and 2), and is equivalent to the display source image 122 shown in FIG. 2. A procedure manual arrangement region 231 is apart of a region of the display source image 230, and is a region in which contents of the procedure manual (the step number 241, the work target portion 242, the work content 243, the related drawing 244, and the completion flag 245 in FIG. 4) are displayed. A drawing arrangement region 232 is a part of the region of the display source image 230, and is a region in which a drawing related to the procedure manual (a drawing identified by the related drawing 244 in FIG. 4 and stored in the drawing database 250) is displayed.

The visual field region 233 is a part of the region of the display source image 230, and is a region displayed on the display 160 (see FIGS. 1 and 2) in the first and second display modes. A size of the visual field region 233 is a display size of the display 160.

The visual field region 233 moves in the display source image 230 in accordance with an orientation of the HMD 100. For example, when the worker faces left and the sensor 170 (see FIG. 2) detects left rotation of the HMD 100, a visual field region 233A on a left side of the display source image 230 is displayed on the display 160.

The procedure manual coordinates 221 (see FIG. 3) are arrangement coordinates of the procedure manual arrangement region 231 in the display source image 230. The arrangement coordinates are, for example, coordinates of an upper left apex and a lower right apex of a region in the display source image 230. The arrangement coordinates may be the coordinates of the upper left apex of the region and a size of the region. The related drawing coordinates 222 are arrangement coordinates of the drawing arrangement region 232 in the display source image 230.

Hereinafter, configurations of visual field images 420, 420A, and 420B in the first to third display modes will be described with reference to FIGS. 6 to 8.

FIG. 6 is a diagram showing a configuration of the visual field image 420 displayed on the display 160 in the first display mode according to the first embodiment. The visual field image 420 is an image corresponding to the visual field region 233 (see FIG. 5), and is a visual field image in the first display mode. The visual field image 420 is an image in which an in-visual field procedure manual region 421 is added to an image obtained by cutting out an in-visual field drawing region 422 to be described later from the display source image 230. In the display 160, since no pixel is displayed in a portion other than the in-visual field drawing region 422 and the in-visual field procedure manual region 421, a worker wearing the HMD 100 can see the workplace (real space) through this portion of the visual field.

The in-visual field procedure manual region 421 is a part of the region of the visual field image 420 and is a region in which the procedure manual is displayed. In the first embodiment, the in-visual field procedure manual region 421 is arranged at a central lower side of the visual field image 420, and may be arranged at another position. The in-visual field procedure manual coordinates 223 (see FIG. 3) are arrangement coordinates of the in-visual field procedure manual region 421 in the visual field image 420.

The in-visual field drawing region 422 is a region in which the visual field region 233 (see FIG. 5) and the drawing arrangement region 232 overlap each other, and is a region including apart of the drawing. Since the visual field region 233 moves in the display source image 230 in accordance with the orientation of the HMD 100, the in-visual field drawing region 422, which is a region where the visual field region 233 and the drawing arrangement region 232 overlap each other, also changes in accordance with the orientation of the HMD 100. For example, when the worker faces left, movement is performed from the visual field region 233 to the visual field region 233A. In this case, the visual field region 233A and the drawing arrangement region 232 do not overlap each other, and therefore the in-visual field drawing region 422 is not present, and the drawing is not displayed on the display 160.

In the first display mode, the in-visual field procedure manual region 421 in the visual field image 420 is fixed, and the procedure manual is always displayed on the display 160, and therefore, the worker can check the procedure manual without changing the orientation. Accordingly, the same is suitable for a case of performing a plurality of relatively short procedures on the same work target, and work efficiency is improved.

FIG. 7 is a diagram showing a configuration of the visual field image 420A displayed on the display 160 in the second display mode according to the first embodiment. The visual field image 420A is an image corresponding to the visual field region 233 (see FIG. 5), and is a visual field image in the second display mode. The visual field image 420A is an image obtained by cutting out the in-visual field drawing region 422 and an in-visual field procedure manual region 423 from the display source image 230. In the display 160, since no pixel is displayed in a portion other than the in-visual field drawing region 422 and the in-visual field procedure manual region 423, a worker wearing the HMD 100 can see the work place through this portion of the visual field.

The in-visual field procedure manual region 423 is a region in which the visual field region 233 and the procedure manual arrangement region 231 overlap each other. The in-visual field drawing region 422 is a region in which the visual field region 233 and the drawing arrangement region 232 overlap each other.

In the second display mode, the in-visual field procedure manual region 423 in the visual field image 420A is not fixed, and the procedure manual is not fixedly displayed. Therefore, the visibility of the real space is improved. Accordingly, the same is suitable for a case of concentrating on and performing a relatively detailed work, and the work efficiency is improved.

Figure 8:
FIG. 8 is a diagram showing a configuration of a visual field image displayed on the display in a third display mode according to the first embodiment.

FIG. 8 is a diagram showing a configuration of a visual field image 420B displayed on the display 160 in the third display mode according to the first embodiment. The visual field image 420B is an image corresponding to the display source image 230, and is a visual field image in the third display mode. The number of pixels of the display 160 is smaller than the number of pixels of a source image, and the visual field image 420B is an image obtained by contracting the display source image 230. The procedure manual arrangement region 231 and the drawing arrangement region 232 are also contracted to form an in-visual field procedure manual region 425 and an in-visual field drawing region 424, respectively.

In the third display mode, since the procedure manual and the drawing can be confirmed at the same time, it is convenient when contents are confirmed before the work is performed. Further, in a case of using a monocular type HMD, even when the procedure manual and the drawing are always displayed on the display, the third display mode may always be used because the visibility to the real space is ensured.

First Embodiment: Configuration of Smartphone: Control Unit

Returning to FIG. 3, the control unit 210 includes a CPU, an arrangement definition unit 211, a display source image generation unit 212, and a display mode control unit 213. The arrangement definition unit 211 receives an instruction of a worker who is a user of the display system 10, and defines (sets) arrangements (arrangement coordinates) of the procedure manual arrangement region 231 and the drawing arrangement region 232 in the display source image 230 (see FIG. 5) and an arrangement of the in-visual field procedure manual region 421 in the visual field image 420 (see FIG. 6). The arrangement definition unit 211 transmits the defined arrangement coordinates to the HMD 100.

The display source image generation unit 212 generates the display source image 230 including a procedure manual and a related drawing related to a work step performed by the worker, and transmits the display source image 230 to the HMD 100.

The display mode control unit 213 determines the display mode and stores the display mode in the display mode 224.

First Embodiment: Arrangement Definition Process

Figure 9:
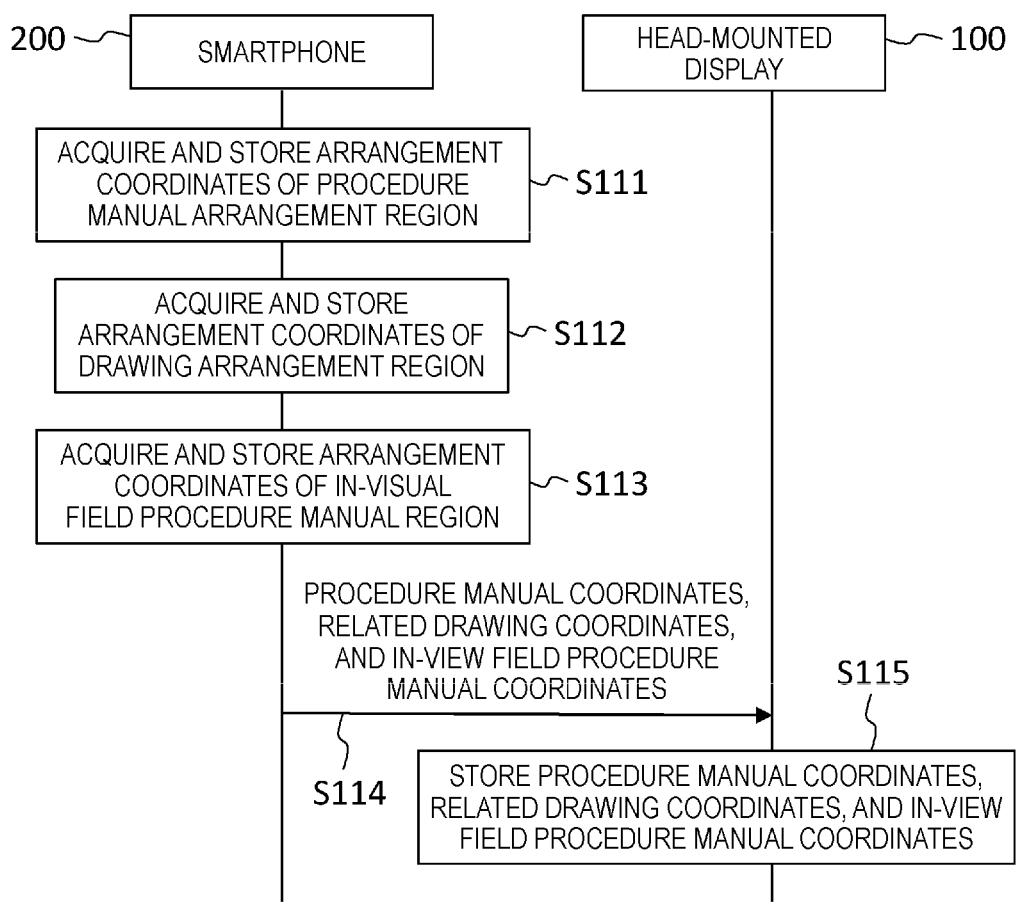
FIG. 9 is a sequence diagram of an arrangement definition process according to the first embodiment.

FIG. 9 is a sequence diagram of an arrangement definition process according to the first embodiment. A process of the smartphone 200 and the HMD 100 that perform setting related to the display source image 230 (refer to FIG. 5) and the visual field image 420 (refer to FIG. 6) will be described with reference to FIG. 9.

In step S111, the arrangement definition unit 211 of the smartphone 200 acquires the arrangement coordinates of the procedure manual arrangement region 231 in the display source image 230 (see FIG. 5) instructed by the worker who is the user of the display system 10, and stores the acquired arrangement coordinates in the procedure manual coordinates 221 (see FIG. 3). The arrangement coordinates are, for example, coordinates of an upper left apex and a lower right apex of the region in the display source image 230.

In step S112, the arrangement definition unit 211 acquires the arrangement coordinates of the drawing arrangement region 232 in the display source image 230 instructed by the worker, and stores the acquired arrangement coordinates in the related drawing coordinates 222.

In step S113, the arrangement definition unit 211 acquires the arrangement coordinates of the in-visual field procedure manual region 421 in the visual field image 420 (see FIG. 6) instructed by the worker, and stores the acquired arrangement coordinates in the in-visual field procedure manual coordinates 223.

In step S114, the arrangement definition unit 211 transmits the procedure manual coordinates 221, the related drawing coordinates 222, and the in-visual field procedure manual coordinates 223 to the HMD 100.

In step S115, the data reception unit 111 of the HMD 100 stores the received procedure manual coordinates 221, the related drawing coordinates 222, and the visual field procedure manual coordinates 223 in the procedure manual coordinates 123, the related drawing coordinates 124, and the visual field procedure manual coordinates 125, respectively.

Next, a process of the display system 10 when the worker uses the display system 10 to work will be described.

First Embodiment: Display Source Image Generation Process

Figure 10:
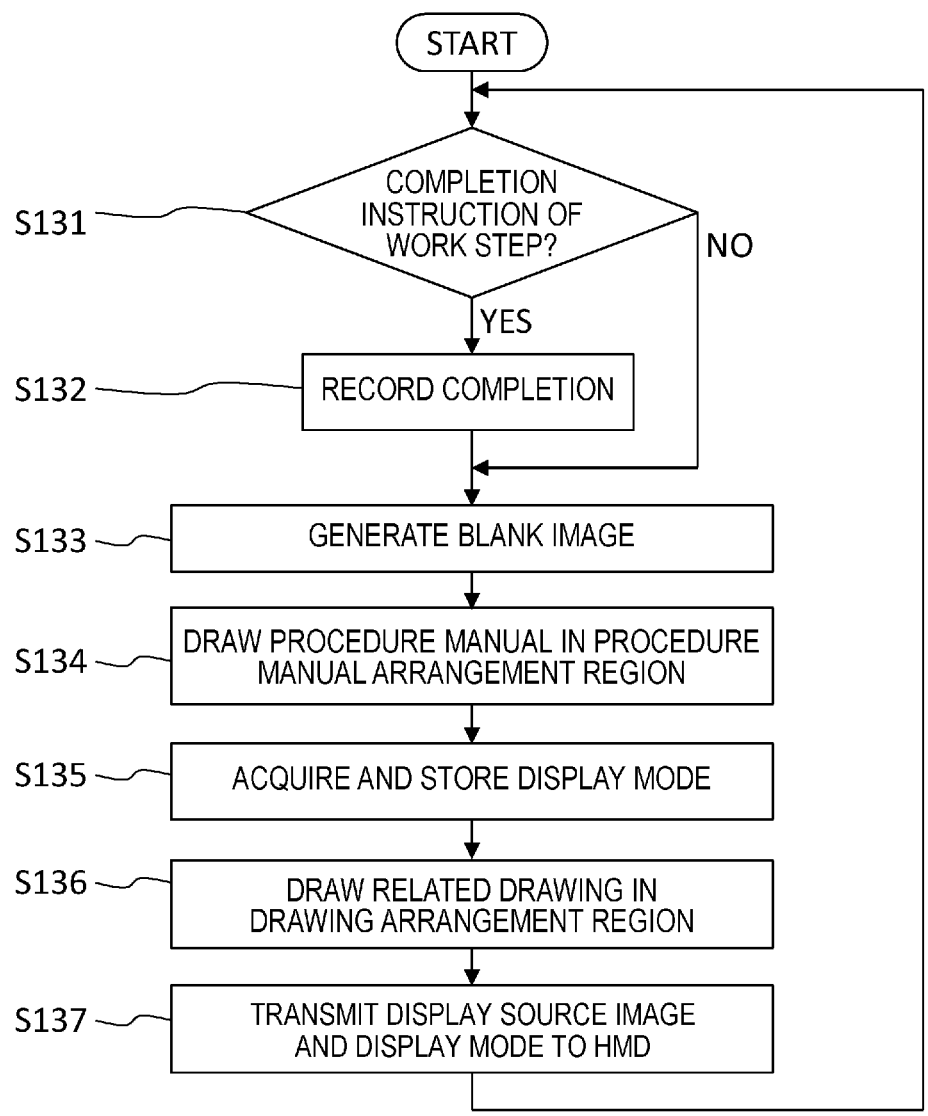
FIG. 10 is a flowchart of a display source image generation process according to the first embodiment.

FIG. 10 is a flowchart of a display source image generation process according to the first embodiment. A process in which the smartphone 200 generates the display source image 230 and transmits the display source image 230 to the HMD 100 will be described with reference to FIG. 10.

In step S131, the display source image generation unit 212 proceeds to step S132 if a completion instruction of a work step is present (step S131→YES), and proceeds to step S133 if no completion instruction of a work step is present (step S131→NO). The completion instruction of a work step is to instruct the display system 10 to record that a work step has been completed by the worker. The display source image generation unit 212 detects vocalization of "work step completion" of the worker from sounds acquired by the microphone 270 (see FIG. 3), thereby determining presence or absence of the completion instruction of a work step. Alternatively, the display source image generation unit 212 may detect a tap of a work step completion button displayed on the touch panel display 260 to determine that the completion instruction of the work step is present.

In step S132, the display source image generation unit 212 records completion of a work step. Specifically, the display source image generation unit 212 updates the completion flag 245 (see FIG. 4) of a current work step to "YES" and updates the completion date and time 246 to current time. The current work step is a work step of which the completion flag 245 is "NO" and the step number 241 is minimum.

In step S133, the display source image generation unit 212 generates a blank image and stores the blank image in the display source image 230.

In step S134, the display source image generation unit 212 draws the procedure manual in the procedure manual arrangement region 231 (see FIG. 5) of the display source image 230. Specifically, the display source image generation unit 212 draws the step number 241, the work target portion 242, the work content 243, the related drawing 244, and the completion flag 245 (see FIG. 4) of the current work step in the procedure manual arrangement region 231.

In step S135, the display mode control unit 213 acquires the display mode 247 of the current work step and stores the display mode 247 in the display mode 224.

In step S136, the display source image generation unit 212 draws the related drawing in the drawing arrangement region 232 of the display source image 230. Specifically, the display source image generation unit 212 acquires a drawing corresponding to identification information in the related drawing 244 of the current work step from the drawing database 250, and draws the acquired drawing in the drawing arrangement region 232.

In step S137, the display source image generation unit 212 transmits the display source image 230 and the display mode 224 to the HMD 100, and returns to step S131. It should be noted that the display mode control unit 213 may transmit the display mode 224 to the HMD 100.

First Embodiment: Visual Field Image Display Process

Figure 11:
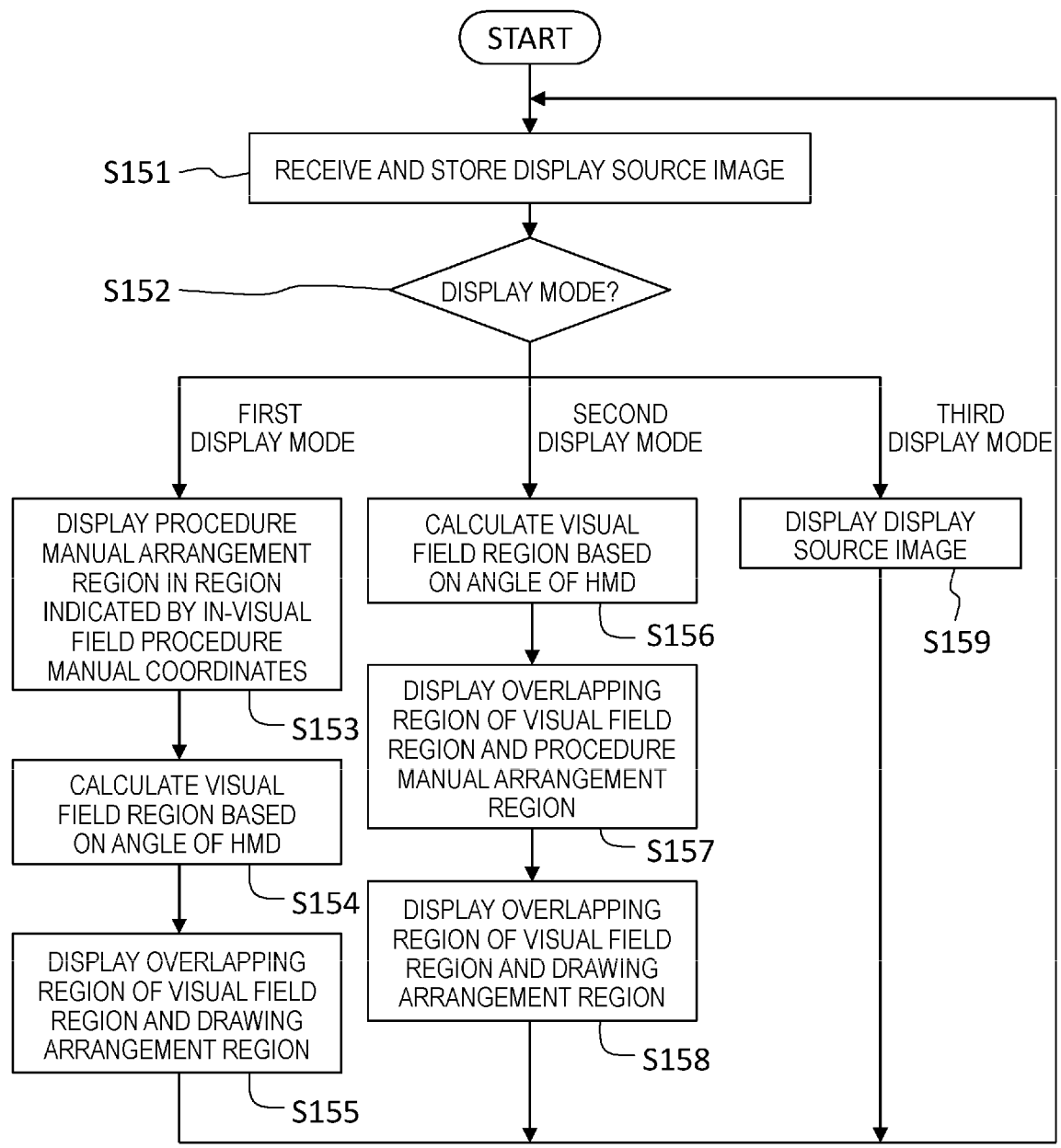
FIG. 11 is a flowchart of a visual field image display process according to the first embodiment.

FIG. 11 is a flowchart of a visual field image display process according to the first embodiment. A process of displaying a visual field image on the display 160 based on the display source image 230 and the display mode 224 received by the HMD 100 from the smartphone 200 (see step S137 in FIG. 10) will be described with reference to FIG. 11.

In step S151, the data reception unit 111 receives the display source image 230 and the display mode 224 transmitted by the smartphone 200, and stores the display source image 230 and the display mode 224 in the display source image 122 and the display mode 126, respectively.

In step S152, the visual field image display unit 112 proceeds to step S153 if the display mode 126 is the first display mode (step S152→first display mode), proceeds to step S156 if the display mode 126 is the second display mode (step S152→second display mode), and proceeds to step S159 if the display mode 126 is the third display mode (step S152→third display mode).

In step S153, the visual field image display unit 112 displays an image of the procedure manual arrangement region 231 (see FIG. 5, the part of the region of the display source image 122 indicated by the procedure manual coordinates 123) in the region of the display 160 indicated by the in-visual field procedure manual coordinates 125 (see the in-visual field procedure manual region 421 in FIG. 6).

In step S154, the visual field image display unit 112 calculates the visual field region 233 (see FIG. 5) based on the orientation (angle) of the HMD 100 acquired by the sensor 170.

In step S155, the visual field image display unit 112 displays an overlapping region of the visual field region 233 and the drawing arrangement region 232 in a corresponding region of the display 160, and returns to step S151. The corresponding region of the display 160 is a region corresponding to the in-visual field drawing region 422 in the visual field image 420 when a display image of the display 160 is regarded as the visual field image 420 (see FIG. 6).

Step S156 is the same as step S154.

In step S157, the visual field image display unit 112 displays an overlapping region of the visual field region 233 and the procedure manual arrangement region 231 in a corresponding region of the display 160. In other words, the visual field image display unit 112 determines a region overlapping the procedure manual arrangement region 231 in the visual field region 233 as the in-visual field procedure manual region 423 in accordance with the orientation of the HMD 100.

Step S158 is the same as step S155.

In step S159, the visual field image display unit 112 displays the display source image 122 on the display 160, and returns to step S151. At this time, a size of the display source image 122 may be changed so that the display source image 122 is entirely displayed on the display 160.

First Embodiment: Characteristics of Display System

The display 160 of the HMD 100 displays the procedure manual and the related drawing of the work step performed by the worker.

In the first display mode, the procedure manual is always displayed in a set position of the display 160 (see the in-visual field procedure manual region 421 in FIG. 6). Therefore, the worker can work while constantly referring to the procedure manual. In addition, the related drawing is displayed in accordance with an orientation of the head (HMD 100) of the worker. It is assumed that a position of the drawing is set to a right side of the display source image 230. In this case, when the worker faces front, the drawing is not displayed, and the worker can work without being obstructed by the drawing. The worker can refer to the drawing by facing right. As a result, the worker can refer to the procedure manual and drawing while working with both hands without operating the smartphone 200 or the HMD 100 with the hands.

In the second display mode, since the procedure manual is not fixedly displayed in the visual field region, the visibility of the real space is improved, and the work efficiency is improved when concentrating on and performing a more detailed work.

In the third display mode, since the procedure manual and the drawing can be confirmed on one display, it is convenient when the contents are confirmed before the work is performed. Further, in the case of using the monocular type HMD, even when the procedure manual and the drawing are always displayed on the display, the third display mode may always be used because the visibility to the real space is ensured.

These display modes are switched in accordance with the work step (see steps S135 and S137 in FIG. 10, and step S152 in FIG. 11). By setting a work mode in accordance with the work content corresponding to the work step, the worker does not need to switch the work mode during work and can concentrate on work, and work efficiency can be increased.

First Embodiment: Modification: Switching of Display Modes

It should be noted that the display system 10 of the first embodiment changes the first to third display modes in accordance with the display mode 247 set in the work manual database 240, and other methods may be used. For example, the display mode control unit 213 may recognize a type of content to be displayed, and when the type is a setting screen (see FIG. 9), the third display mode may be used, and when the type is a work screen, the first display mode may be used. Alternatively, the display mode control unit 213 may acquire a type (monocular/binocular) of the HMD from the HMD 100, and when the type is the monocular type, the third display mode is used, and when the type is the binocular type, the first display mode is used. The display mode control unit 213 may switch the display modes in accordance with a voice command of the worker acquired by the microphone 270 (see FIG. 3).

Second Embodiment

In the first embodiment, the HMD 100 switches the display modes according to the display mode 126 transmitted by the smartphone 200. The display modes may be switched by operating the HMD 100 by the worker.

Figure 12:
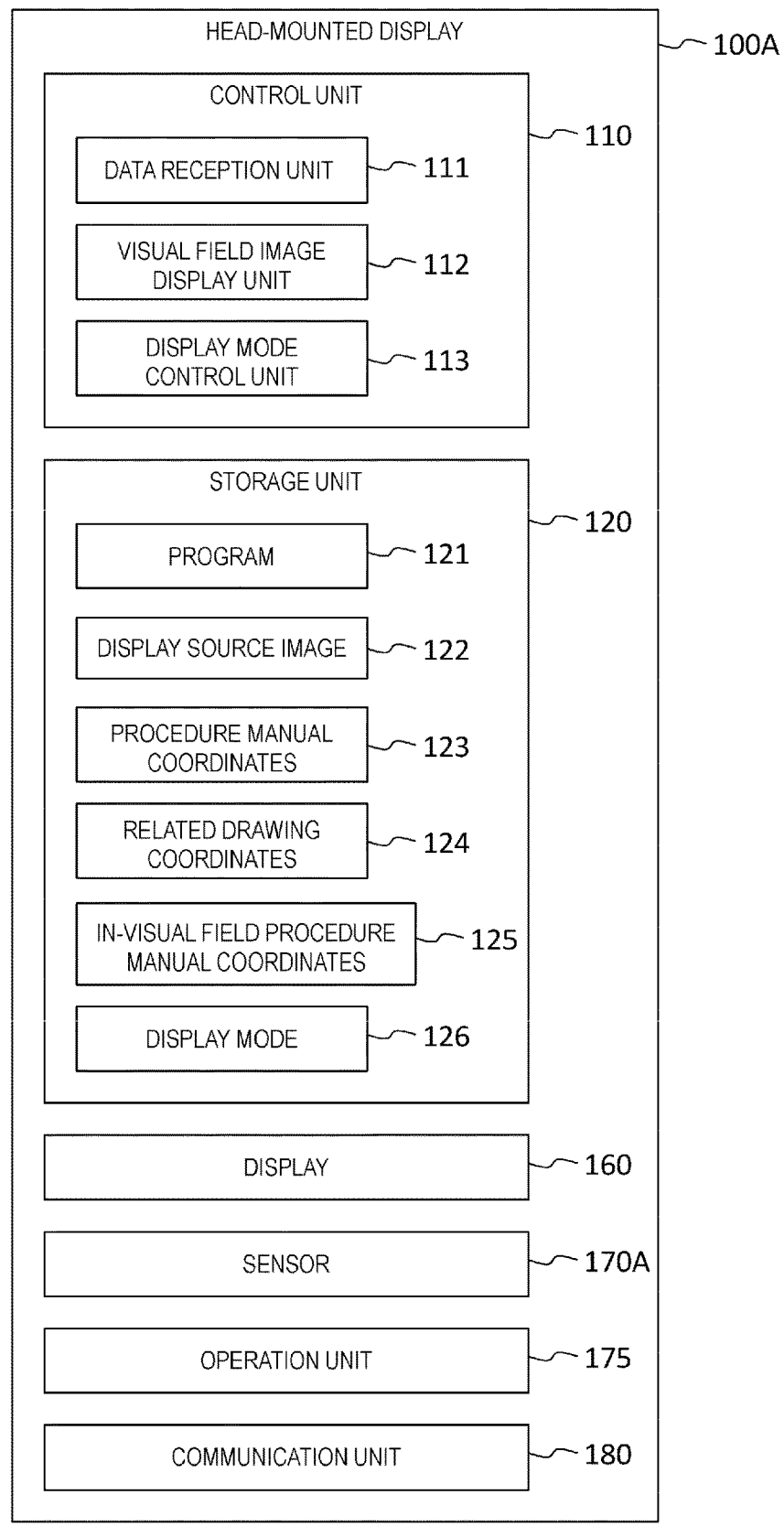
FIG. 12 is a functional block diagram of a HMD according to a second embodiment.

FIG. 12 is a functional block diagram of a HMD 100A according to a second embodiment. As compared with the HMD 100 (see FIG. 2) according to the first embodiment, the HMD 100A includes an operation unit 175, the control unit 110 includes a display mode control unit 113, and a sensor 170A includes a microphone.

The operation unit 175 is, for example, a button. The display mode control unit 113 recognizes a voice picked up by the microphone included in the sensor 170A and switches the display control modes. The display mode control unit 113 recognizes, for example, a voice of "display mode 1" and switches the display mode to the first display mode. In addition, each time the button of the operation unit 175 is pressed, the display mode control unit 113 switches the first display mode, the second display mode, and the third display mode in order by toggling.

In the first embodiment, the display mode is as set in the display mode 247 (see FIG. 4), and is fixed in accordance with the work step (work content). In the second embodiment, the switching can be performed depending on convenience of the worker, and usability of the display system 10 is improved.

Third Embodiment

Figure 13:
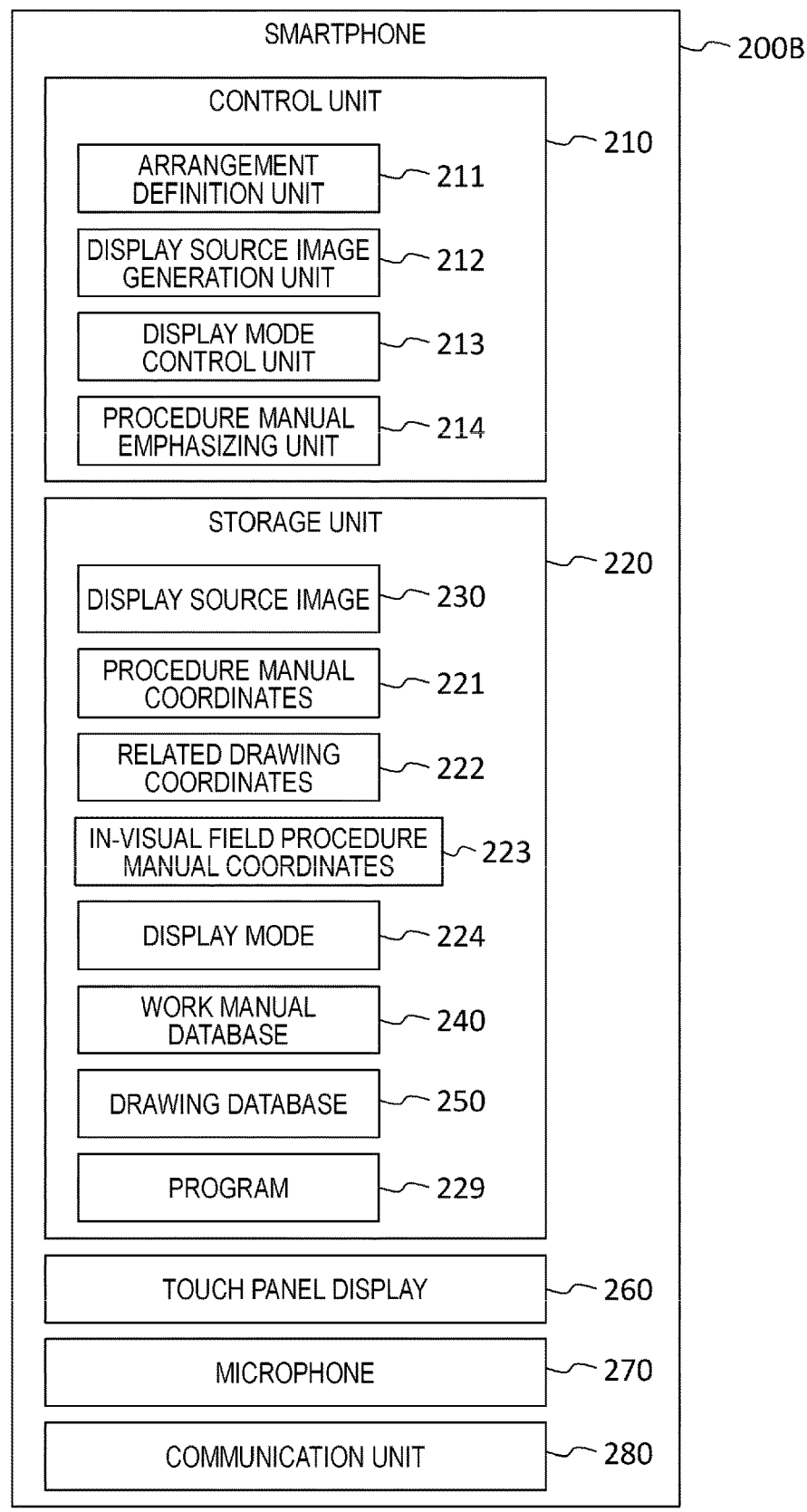
FIG. 13 is a functional block diagram of a smartphone according to a third embodiment.

FIG. 13 is a functional block diagram of a smartphone 200B according to a third embodiment. In the third embodiment, a procedure manual emphasizing unit 214 that emphasizes a difference in the procedure manual is added. The procedure manual emphasizing unit 214 emphasizes and displays a difference from a previous work procedure in the work content 243 (work procedure) in the work manual database 240. Accordingly, it is possible to prevent misreading of the work procedure and the like.

Figure 14:
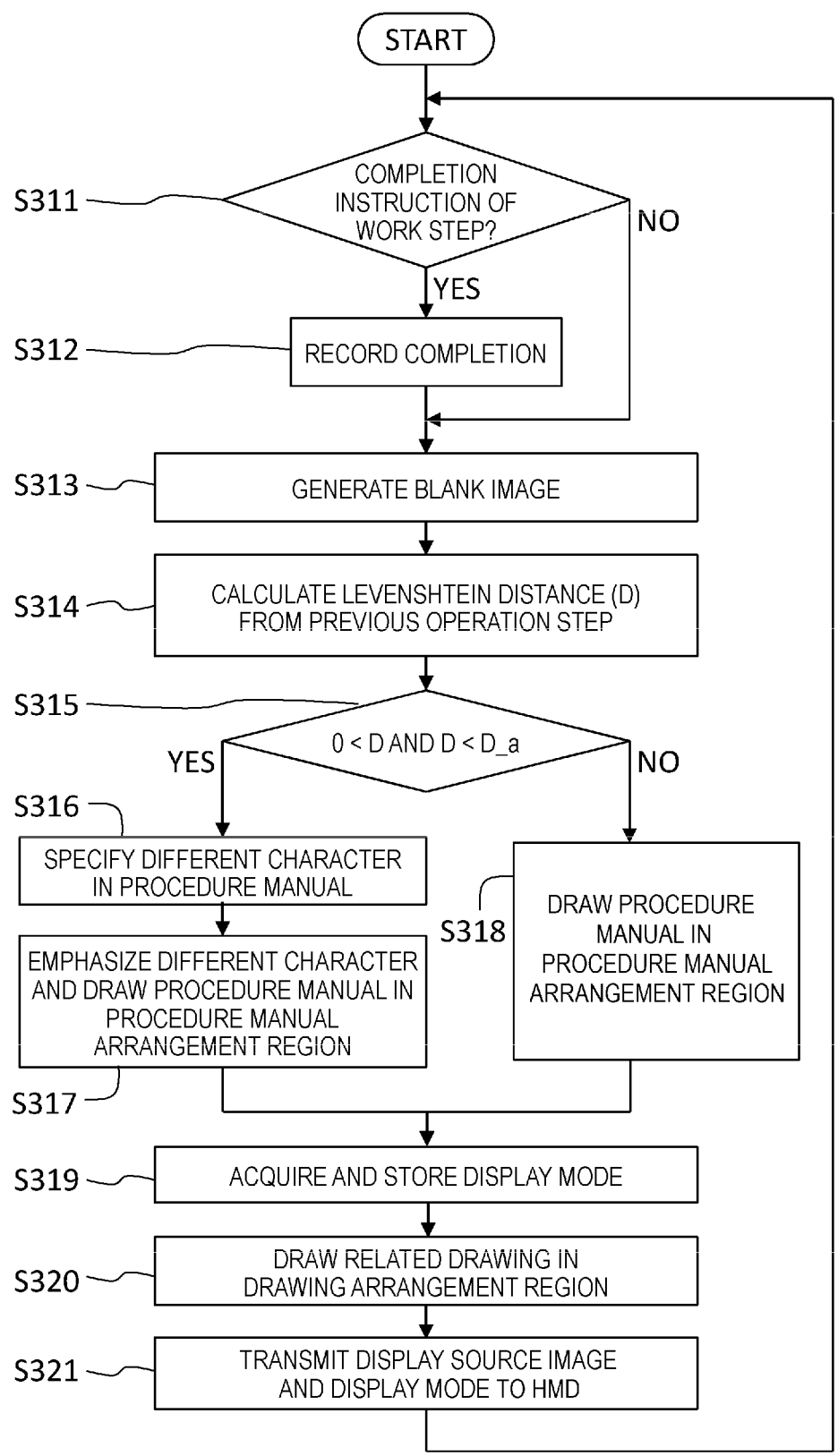
FIG. 14 is a flowchart of a display source image generation process according to the third embodiment.

FIG. 14 is a flowchart of a display source image generation process according to the third embodiment.

Steps S311 to S313 are the same as steps S131 to S133 shown in FIG. 10, respectively.

In step S314, the procedure manual emphasizing unit 214 calculates a difference between a procedure manual of a current work step and a procedure manual of a previous operation step. For calculation of the difference, for example, a Levenshtein distance is used.

In step S315, the procedure manual emphasizing unit 214 proceeds to step S316 when a Levenshtein distance D calculated in step S314 is larger than 0 and smaller than a predetermined threshold value (D_a) (step S315→YES), and proceeds to step S318 in other cases (step S315→NO).

In step S316, the procedure manual emphasizing unit 214 specifies a character different between the current procedure manual and the previous procedure manual.

In step S317, the display source image generation unit 212 emphasizes the character specified in step S316 by changing a character color or the like to draw the procedure manual in the procedure manual arrangement region 231 (see FIG. 5) of the display source image 230.

Steps S318 to S321 are the same as steps S134 to S137 shown in FIG. 10, respectively.

Characteristics of Third Embodiment

In the third embodiment, when procedure manuals (work contents) of previous and next thereto work steps are similar, the procedure manuals are displayed such that the difference can be seen. Accordingly, it is possible to prevent assumption and misreading of the worker and to perform a more reliable work.

In the third embodiment, the procedure manuals of the previous and next thereto work steps are compared. When the current work step includes a plurality of work procedures, differences between the plurality of work procedures may be emphasized.

Modification: Visual Field Region

In the embodiments described above, the visual field region 233 (see FIG. 5) is calculated based on the orientation of the HMD 100 detected by the sensor 170 (see step S154 in FIG. 11). On the other hand, the visual field region 233 may be determined based on other information.

As a first example, the sensor 170 may include a visual line sensor that detects a visual line of a worker wearing the HMD 100, and the visual field image display unit 112 may determine a movement direction of the visual field region 233 in accordance with the visual line. For example, the visual field region 233 in the display source image 230 may be moved, in accordance with the orientation of the visual line such as up, upper right, or left, from a current position in the same direction as the visual line.

As a second example, the visual field image display unit 112 may determine the movement direction of the visual field region 233 in accordance with a voice of the worker detected by the microphone included in the HMD 100 or the smartphone 200. For example, the voice of the worker indicating the direction such as up, upper right, or left may be detected, and the visual field region 233 in the display source image 230 may be moved in the same direction as the instruction by the voice.

As a third example, the visual field image display unit 112 may determine the movement direction of the visual field region 233 in accordance with a direction of sound detected by the microphone included in the HMD 100. This sound is a sound of a work target (a preset sound source), and is, for example, an engine sound or a motor sound. For example, the direction of the sound of the work target may be detected, and the visual field region 233 may be moved in the same direction as the sound.

In the first to third examples, the visual field image display unit 112 determines the movement direction of the visual field region 233 in accordance with the visual line, the voice, and the sound of the work target. Alternatively, the visual field image display unit 112 may determine the position of the in-visual field drawing region 422 in the visual field image 420 (see FIGS. 6 and 7). For example, the in-visual field drawing region 422 may be arranged on up, upper right, or left of the visual field image 420 (a region on up, upper right, left, or the like of a center of the visual field image 420) in accordance with the visual line, the voice, the sound of the object, or the like in the direction such as the up, the upper right, or the left. When performing arrangements, the visual field image display unit 112 displays the drawing arrangement region 232 of the display source image 230 (see FIG. 5) in a region on up, upper right, left, or the like of a center of the display 160.

In addition, in a case of the sound of the object, the in-visual field drawing region 422 may be arranged in a region on up, upper right, left, or the like of a center of the visual field image 420 in a direction opposite to the direction of the sound of the object. By arranging the in-visual field drawing region 422 in the opposite direction, a visual field in a direction in which the object is present can be ensured for the worker, and the work is facilitated.

In order to ensure the visual field, it is desirable to display the drawing arrangement region 232 to be in contact with an end (periphery) of the display 160 in the region on the up, the upper right, the left, or the like of the center of the display 160.

Other Modifications

The invention can be implemented in various other embodiments, and various changes such as omissions and substitutions can be made without departing from the spirit of the invention. For example, a function unit and data of the smartphone 200 may be incorporated into the HMD 100. In such a case, the display system 10 can be regarded as the HMD 100.

Components (function units) of the control unit 110 of the HMD 100 and the control unit 210 of the smartphone 200 may be moved. For example, all of the arrangement definition unit 211, the display source image generation unit 212, and the display mode control unit 213 may be included in the HMD 100. In this case, the display source image generation unit 212 and the display mode control unit 213 of the HMD 100 access the work manual database 240 and the drawing database 250 stored in the smartphone 200. When the storage unit 120 of the HMD 100 is small, such an embodiment is suitable.

In the embodiments and the modifications described above, the smartphone 200 generates the display source image and transmits the display source image to the HMD 100, and the HMD 100 cuts out the image of the drawing and the image of the procedure manual from the display source image and displays the cut-out images on the display 160. The smartphone 200 may transmit the image of the drawing and the image of the procedure manual, and the HMD 100 may cut out the image of the drawing and the image of the procedure manual and display the cut-out images on the display 160. The smartphone 200 may transmit a text instead of a text image to the HMD 100, and the HMD 100 may image the text.

These embodiments and modifications thereof are included in the scope and gist of the invention described in the description, and are also included in the inventions described in the claims and equivalents thereof.

What is claimed is:

1. A display device comprising:
a display;
a sensor;
a visual field image display unit configured to display a first image in a first display region of the display and display a second image related to the first image in a second display region of the display device; and
a display mode control unit configured to acquire a display mode associated with the first image,
wherein the sensor is configured to detect:
an orientation of the display device,
an orientation indicated by a voice of the user of the display, or
a direction of a sound of a preset sound source, and
wherein the visual field image display unit is configured to:
determine the second display region according to a direction that is a detection result detected by the sensor; and
set a predetermined fixed region of the display as the first display region when the display mode is a first display mode, and
determine the first display region according to the orientation of the display when the display mode is a second display mode.

2. The display device according to claim 1,
wherein the visual field image display unit is configured to:
display the second display region in a region of the display in the direction that is a detection result detected by the sensor from a center of the display, or
move the second display region before detection in the display in the direction that is the detection result detected by the sensor.

3. The display device according to claim 2,
wherein the sensor is configured to detect:
an orientation of a visual line of a user of the display device,
a direction indicated by a voice of the user of the display device, or.

4. The display device according to claim 1,
wherein the sensor is configured to detect:
an orientation of a visual line of a user of the display device,
a direction indicated by a voice of the user of the display device, or.

5. The display device according to claim 1,
wherein the display mode control unit is configured to acquire the display mode from one of voices acquired by an external device, an operation unit provided in the display device, and a microphone provided in the display device.

6. The display device according to claim 1,
wherein the sensor is configured to detect a direction of a sound of a preset sound source, and
wherein the visual field image display unit is configured to:
- display the second display region in a region of the display in a direction opposite to the direction that is a detection result detected by the sensor from a center of the display, or
- move the second display region before detection in the display in the direction opposite to the direction that is the detection result detected by the sensor.

7. A display device of a display system, the display system including the display device and a portable device,
wherein the portable device includes:
- a display source image generation unit configured to generate a display source image including a first image and a second image related to this first image and transmit the display source image to the display device; and
- a display mode control unit configured to transmit a display mode associated with the first image to the display device, wherein the display device includes:
- a display;
- a detector configured to detect an orientation of the display; and
- a visual field image display unit configured to display the first image in a first display region of the display and display the second image in a second display region of the display, wherein the visual field image display unit is configured to:
- set a predetermined fixed region of the display as the first display region and determine the second display region according to the orientation of the display when the display mode is a first display mode, and
- determine the first display region and the second display region according to the orientation of the display when the display mode is a second display mode.

8. A display system comprising:
- a display;
- a detector configured to detect an orientation of the display;
- a display source image generation unit configured to generate a display source image including a first image and a second image related to this first image; and
- a visual field image display unit configured to display the first image in a first display region of the display and display the second image in a second display region of the display, wherein the visual field image display unit is configured to:
- set a predetermined fixed region of the display as the first display region and determine the second display region according to the orientation of the display when a display mode associated with the first image is a first display mode, and
- determine the first display region and the second display region according to the orientation of the display when the display mode is a second display mode.

9. The display system according to claim 8,
wherein the visual field image display unit is configured to display the display source image on the display when the display mode is a third display mode.

10. The display system according to claim 9,
wherein when the display is a monocular display, the visual field image display unit is configured to display the display source image on the display when the display mode is the third display mode.

11. The display system according to claim 8,
wherein the first image is a text image, and
wherein the display source image generation unit is configured to:
- generate a plurality of display source images, and
- obtain a difference between a text of a first image included in a display source image generated last time and a text of a first image included in a display source image generated this time, emphasize this difference, and generate the display source image when this difference satisfies a predetermined condition.

12. The display system according to claim 11,
wherein the display source image generation unit is configured to obtain the difference by using a Levenshtein distance.

13. The display system according to claim 8,
wherein the first image is a text image,
wherein the text includes a plurality of partial texts, and
wherein the display source image generation unit is configured to obtain a difference between the plurality of partial texts, emphasize this difference, and generate the display source image when this difference satisfies a predetermined condition.

14. The display system according to claim 13,
wherein the display source image generation unit is configured to obtain the difference by using a Levenshtein distance.

* * * * *